United States Patent [19]
Zibritosky

[11] 3,885,072
[45] May 20, 1975

[54] ATTACHMENT OF RIGID MEMBERS TO FRANGIBLE WINDOW PANELS

[75] Inventor: George Zibritosky, Pittsburgh, Pa.

[73] Assignee: PPG Industries, Inc., Pittsburgh, Pa.

[22] Filed: May 3, 1973

[21] Appl. No.: 357,055

Related U.S. Application Data

[63] Continuation of Ser. No. 85,153, Oct. 29, 1970, abandoned, which is a continuation-in-part of Ser. No. 829,366, June 2, 1969, abandoned.

[52] U.S. Cl. .............. 428/38; 52/208; 52/616; 156/99; 156/109; 428/81; 428/99
[51] Int. Cl. ...... B32b 1/04; B32b 3/02; B32b 17/06; C03c 27/08; E06b 3/24
[58] Field of Search .......... 161/1, 41, 44, 149, 196; 156/99, 107, 109; 52/208, 397, 616, 623

[56] References Cited
UNITED STATES PATENTS

| | | | |
|---|---|---|---|
| 2,409,808 | 10/1946 | Sowle | 52/208 X |
| 2,576,392 | 11/1951 | Downes | 52/208 |
| 2,750,312 | 6/1956 | Bloom, Jr. et al. | 161/44 |
| 2,808,355 | 10/1957 | Christie et al. | 161/44 X |
| 3,171,771 | 3/1965 | Badger et al. | 161/44 |
| 3,444,662 | 5/1969 | Partain | 52/208 X |

Primary Examiner—Philip Dier
Attorney, Agent, or Firm—Thomas F. Shanahan

[57] ABSTRACT

This disclosure relates to adhering a layer of ductile material to surface portions of a brittle sheet and adhesively bonding thereto a rigid attachment.

12 Claims, 3 Drawing Figures

PATENTED MAY 20 1975 3,885,072
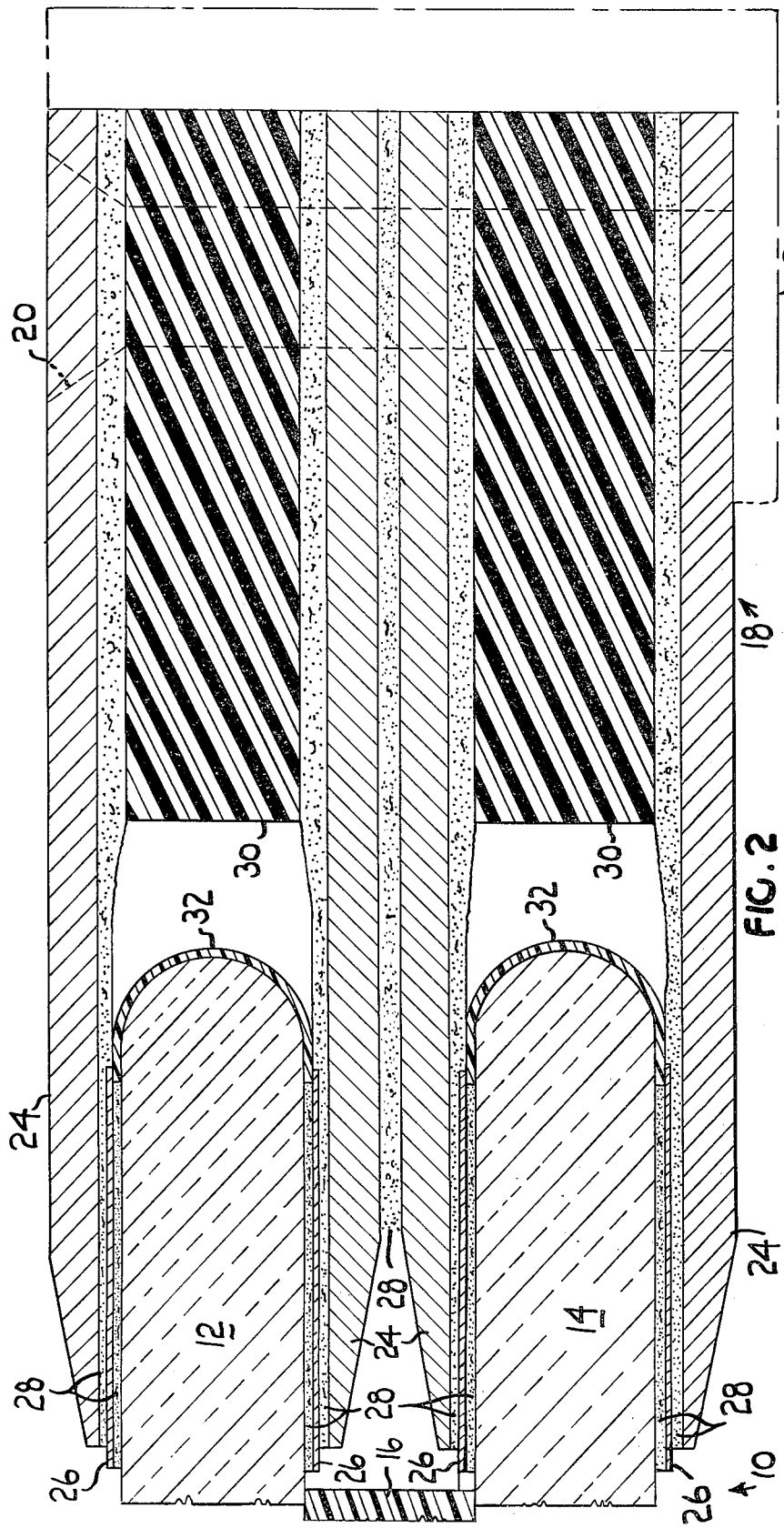
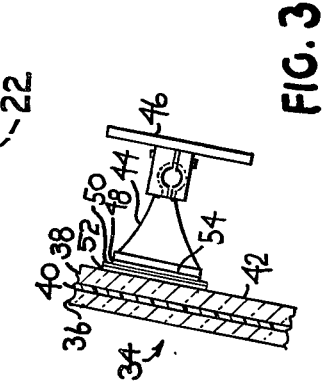
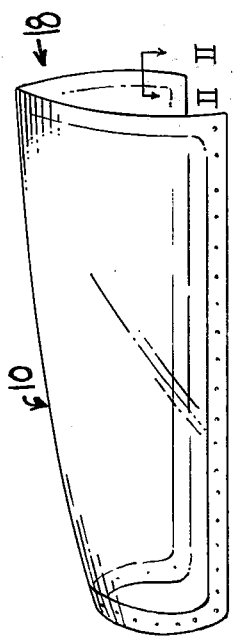
INVENTOR
GEORGE ZIBRITOSKY
ATTORNEYS

ATTACHMENT OF RIGID MEMBERS TO FRANGIBLE WINDOW PANELS

CROSS-REFERENCE TO RELATED APPLICATIONS

This application is a continuation of application Ser. No. 85,153, filed Oct. 29, 1970, now abandoned, which application is a continuation-in-part of application Ser. No. 829,366, filed June 2, 1969, now abandoned.

BACKGROUND OF THE INVENTION

This invention relates to window panels and has particular relation to window panels used for aircraft. More specifically, the present invention relates to aircraft window panels having improved marginal surface portions for adhesively securing the panels to other panel components and, in particular, to edge supporting structure fixed to the panel and to the body or airframe of the aircraft.

Over the years, one problem that has plagued aircraft panel designs and uses is the occurrence of "spalling" or "peel chipping" in frangible window panels that are adhesively secured about their margins to a rigid panel attachment structure. This spalling or peel chipping originates in the area of the edge attachment structure and is a result of locally induced stress risers being imposed on the panel and overcoming the cohesive bond between adjacent portions of the frangible panel material, thereby actually separating a chip of the panel material from the body of the panel. These locally induced stress risers may derive their origin from any load applied to the panel, whether mechanical or thermal in nature or a combination of both. For example, these stress risers may be due to inhomogeneity of the adhesive, voids in the adhesive, locally applied loads, pressurization of the aircraft, operation of defogging devices, thermal shock, thermal gradients due to speed, altitude or the manner of operation of the aircraft, etc. Moreover, when a rigidly bonded and highly constraining panel edge attachment and supporting arrangement is used, any locally induced stress riser that does occur readily manifests itself as a highly concentrated stress condition imposed on adjacent portions of the panel material.

As will be apparent, when peel chipping occurs as a result of stress risers, the affected area of the panel thereafter becomes a point of incipient weakness from which further degradation of the structural integrity and utility of the panel can originate. The severity and extent of the occurrence (i.e., amount) of this peel chipping may vary widely from panel to panel, but nevertheless can ultimately be determinative of the service life of the panel. Moreover, the extent of damage from peel chipping is often difficult or impossible to detect until the damage extends into the vision area of the panel and, often, such damage results in catastrophic failure of tempered glass panels. Potentially, this represents a very hazardous condition, which is generally dealt with by merely replacing panels as required. As will be appreciated, panel replacement is very expensive in terms of labor, out of service time for the aircraft and panel costs, and, even if replaced before total failure occurs, only potentially avoids, rather than eliminates, the hazards incidental to the occurrence of peel chipping.

This invention is directed toward eliminating or substantially reducing the occurrence of peel chipping, and thereby improving the performance and reliability of adhesively bonded attachments to frangible materials, such as glass, ceramics, graphites, carbon-like materials, and brittle plastics. In accordance with the present invention, a thin, ductile foil is bonded to the brittle panel surface, and a load-carrying attachment is bonded to the foil. Thus, when any loads, mechanical or thermal, are applied to the panel, depending on their origin they are transmitted through the thin, ductile foil either to the brittle material or from the brittle material to the load-carrying attachment. The foil yields locally due to any stress risers, such as inhomogeneity of adhesive, voids, locally applied loads, thermal gradients, etc., thus reducing the stress concentrations by redistributing loads over a greater area. In effect, the foil provides the brittle-like base material with a ductile surface, thereby reducing its susceptibility to failure via high stress concentrations.

The above and other objects, features and advantages of this invention will become more apparent during the course of the following description, when taken in conjunction with the accompanying drawing, in which:

FIG. 1 is a pictorial representation of an aircraft window panel or canopy within the contemplation of this invention;

FIG. 2 is a cross-section along the line II—II of FIG. 1 showing details of one preferred embodiment of this invention; and FIG. 3 illustrates use of the invention for mounting rearview mirror brackets on windshields.

In FIG. 1 there is shown a typical aircraft window panel 10 produced in accordance with this invention. As best shown on a greatly enlarged scale in FIG. 2, panel 10 is a laminated panel comprised of a pair of glass sheets 12 and 14, in which the sheet of glass 12 constitutes the outboard ply and the sheet of glass 14 is the inboard ply of the panel 10 in its installed position. Interposed between the two sheets of glass 12 and 14 is a plastic interlayer 16 which bonds the glass plies together. Typical plastic interlayer materials that may be used include those disclosed in U.S. Pat. No. 3,356,833 and U.S. Pat. No. 3,388.101, both assigned to applicant's assignee. Also affixed to the glass plies 12 and 14 and extending around the periphery of the panel 10 is a panel edge attachment structure 18. Edge attachment structure 18 is provided with a plurality of apertures 20, which receive bolts (not shown) that threadably secure the glass plies to the body or airframe (illustrated, in part, at 22 in FIG. 2) of the aircraft.

Edge attachment structure 18, as shown, is comprised of two pairs of spaced metal frame or strap members 24, each of which extends around the periphery of one of the glass plies 12 and 14. Strap members 24 are adhesively bonded by a thin layer of cement 28 to ductile metal foil members 26, which also extend around the peripheral margins of the glass plies and which, in turn, are adhesively bonded by a thin (i.e., up to 10 mil thick) layer of cement 28 to the major surfaces of these plies, along opposite surface portions thereof. Frame or strap members 24 also extend beyond the edges of the glass plies 12 and 14, and the extended portion of each of these pairs of strap members has interposed therebetween a peripherally extending spacer 30. As shown, spacers 30 are spaced from the peripheral edges of the glass plies and are adhesively bonded by a layer of cement 28 to the remainder of the extended portion of each of the adjacent strap members 24. In addition, the strap members 24 that are disposed between laminated glass plies 12 and 14 are adhesively bonded together by a layer of cement 28. As will be noted, the peripheral edges of the glass plies are preferably covered with a strip of pressure-sensitive tape 32, such as a pressure-sensitive Teflon (polytetrafluoroethylene) brand tape, to avoid the possibility of cement 28 adhering to these otherwise unprotected edges, which could serve to provide sites for the origin of peel chipping.

Cleavage or peel-type tests were conducted and showed that the foregoing design incorporating the ductile foil was consistently superior to similar non-foil specimens. Failure values obtained for 14 non-foil specimens varied between 0 and 155 inch pounds per inch width, while values for 21 foil barrier specimens varied between 115 and 170 inch pounds per inch width. Approximately 80 percent of the tempered glass, non-foil specimens resulted in catastrophic failure of the glass, whereas no glass breakage or peel chipping was obtained on specimens incorporating the foil barrier. Only delamination between the foil and the edge attachment occurred.

It was further shown that maximum peel strength values obtained on annealed, chemically and thermally tempered glass were about equal. However, results obtained with thermally tempered glass were consistently higher.

Thermal cycling tests were also conducted on 20 inch by 50 inch foil and similar non-foil panels. In these tests, the average temperature at peel-chip failure for non-foil panels was about 400°F. However, in panels with the foil barrier, failure did not occur, although temperatures exceeded 600°F, and the testing was terminated due to degradation of the interlayer material.

From the foregoing, it will be apparent that the peel chip strength of the foil panels of this invention is vastly superior to that of non-foil panels. In particular, it will be appreciated that, when exposed to either mechanical loading or elevated temperatures or when subjected to thermal cycling conditions, panels produced in accordance with this invention are considerably less likely to fail as a result of peel chipping or panel breakage than as a result of failure of one of the other components of the panel assembly.

In connection with this invention, it is not considered essential that the foil used be of any particular material or thickness. Moreover, the foil material need not necessarily match the coefficient of thermal expansion of the glass. The only requirement is that the foil is ductile, i.e., it gives or stretches under localized loading to distribute such loading over a larger area. Various metal foils that have been successfully used with this invention include brass, kovar, titanium and stainless steels. Generally, the foils that have been used fell in a thickness range of two one-thousandths to three one-thousandths inch thick in order to facilitate readily conforming the foil to the adhesive cements used and the other components of the panel. However, it is also considered feasible to use foils ranging in thickness upwards of ten one-thousandths to twelve one-thousandths inch thick without incurring a substantial likelihood of the foil becoming so rigid or non-ductile as to permit peel chipping or glass breakage to occur.

Also, no particular adhesive cement is considered to be required in connection with the practice of this invention. In practical applications for high-performance aircraft, however, the cement used should be a high temperature resistant, high strength material. One such material that has been successfully used is a high temperature phenoxy cement with a particulate aluminum filler.

In addition, as heretofore set forth, panel materials or brittle materials that are considered to be usable with this invention include tempered, semi-tempered and annealed glass, ceramic materials, graphites, carbon-like materials, plastics, and combinations thereof. In general, the use of any brittle or frangible material can be enhanced in accordance with the practice of this invention. Also, the use of the invention is not necessarily confined to aircraft applications, since it should be apparent that other uses involving the potential occurrence of stress risers that could cause peel chipping or panel breakage can benefit by the application of the principles of this invention. For example, shown in FIG. 3 is an application of this invention for mounting rearview mirror brackets on windshields.

Illustrated in FIG. 3 is a portion of a windshield 34 constructed in the conventional manner and comprised of a pair of glass sheets 36 and 38 bonded together by interlayer material 40. Mounted on major surface 42 of sheet 38 is a rearview mirror bracket 44 for securing thereto a rearview mirror assembly 46. In accordance with the present invention, bracket 44, which is preferably metallic, e.g., aluminum, sintered metal, pot metal, etc., is bonded by a thin layer of rigid adhesive or cement material 48 to a continuous, ductile metal foil member 50. Foil member 50, in turn, is bonded to surface 42 by a thin layer of rigid adhesive or cement material 52, of the same or of a dissimilar composition to adhesive or cement material 48. Preferably, as shown, foil member 50 extends beyond the perimeter of the mounting surface 54 of bracket 44, e.g., by at least one thirty-second to one-sixteenth inch, to avoid bridging of cement layers 48 and/or 52 around the edges of foil member 50 and to provide a larger foil area for distributing or relieving localized stress risers or stress concentrations occurring at or near the perimeter of mounting surface 54.

Identical aluminum rearview mirror brackets were bonded or cemented to windshields both directly, i.e., no foil, and in accordance with this invention. The cement used in each case was an anaerobic polyacrylate cement with the specimens prepared according to this invention using less than a 5 mil thick layer of the cement on either side of a 3 mil thick foil member of stainless steel. Each specimen was then subjected to repetitive cold cycling tests which consisted of placing the specimens in a chamber at −20°F for 4 hours, then moving the specimens to a second chamber at 120°F for 4 hours and, thereafter, repeating 4 hours of exposure in the first chamber at −20°F followed by 4 hours of exposure in the second chamber at 120°F. Specimens that successfully completed the above cycles without glass failure, metal (foil) to metal (bracket) adhesive failure or metal (foil) to glass adhesive failure were then repetitively cycled, as above, at −40°F and 120°F, −60°F and 120°F, −80°F and 120°F, −100°F and 120°F and −120°F and 120°F.

The specimens using stainless steel foil in which the foil extended at least one thirty-second inch beyond the perimeter of the bracket mounting surface successfully withstood all cold cycling tests to and including −120°F. On the other hand, all of the specimens having the bracket cemented directly to glass failed above −60°F and, in these failures, exhibited a higher incidence of glass failure than of adhesive failure. Thus, once again, use of the foil barrier or foil interleaving of this invention provided a significant improvement in the structural integrity of rigid attachments bonded to brittle materials, such as glass.

Although the present invention has been described with reference to specific details of certain embodiments thereof, it is not intended that such details shall be regarded as limitations upon the scope of the invention except insofar as included in the accompanying claims.

I claim:

1. A panel assembly comprising a panel of brittle sheet material selected from the group consisting of glasses, ceramics, graphites, carbon-like materials, plastics and combinations thereof, a ductile metallic foil having a first major surface thereof rigidly bonded by a high temperature resistant, high strength resinous cement to portions of a major surface of said brittle sheet material and a rigid edge attachment extending beyond the periphery of said brittle sheet material, for attachment to a panel assembly support, and being rigidly bonded by a high temperature resistant, high strength resinous cement to the thicknesswise opposite major surface of said ductile foil.

2. A panel assembly according to claim 1 wherein said metallic foil is selected from the group consisting of brass, kovar, titanium and stainless steels.

3. A panel assembly according to claim 1 wherein said metallic foil is bonded to said brittle sheet material by a phenoxy cement.

4. A panel assembly according to claim 3 wherein said phenoxy cement contains a particulate metal dispersed therein.

5. A panel assembly according to claim 1 wherein said panel assembly is comprised of a plurality of rigid, transparent plies of brittle sheet material bonded together by plastic interlayer material.

6. A panel assembly according to claim 5 wherein at least one of said rigid, transparent plies is composed of glass.

7. A panel assembly according to claim 6 wherein said glass is tempered.

8. A panel assembly according to claim 1 wherein said ductile foil is bonded to a marginal side surface portion of opposed major surface portions of said brittle sheet material.

9. A panel assembly according to claim 1 wherein said assembly is comprised of at least a pair of rigid transparent plies of brittle sheet material bonded together by plastic interlayer material, each of said plies of said pair of plies of brittle sheet material having a pair of opposed major surfaces having respective opposed marginal side surface portions, said ductile foil comprises pairs of foil portions, each foil portion being bonded to an extending conformably along a respective one of said marginal side surface portions defined by said opposed major surfaces of each of said plies of said pair of plies of said brittle sheet material, and said rigid attachment comprises pairs of spaced metallic frame members, each frame member being bonded to a respective one of said foil portions and extending around the periphery of a respective one of said rigid, transparent plies.

10. A panel assembly according to claim 9 wherein said ductile metallic foil portions are selected from the group consisting of brass, kovar, titanium and stainless steels.

11. A panel assembly according to claim 10 wherein at least one of said rigid, transparent plies is composed of glass.

12. A panel assembly according to claim 11 wherein said glass is tempered.

* * * * *

UNITED STATES PATENT OFFICE
CERTIFICATE OF CORRECTION

PATENT NO. : 3,885,072
DATED : May 20, 1975
INVENTOR(S) : George Zibritosky

It is certified that error appears in the above-identified patent and that said Letters Patent are hereby corrected as shown below:

Column 5, Claim 5, line 39, "panel" should be deleted.

Signed and Sealed this twenty-sixth Day of August 1975

[SEAL]

Attest:

RUTH C. MASON
*Attesting Officer*

C. MARSHALL DANN
*Commissioner of Patents and Trademarks*